(12) United States Patent
Beers et al.

(10) Patent No.: US 9,745,858 B2
(45) Date of Patent: Aug. 29, 2017

(54) AIR CYCLE MACHINE TURBINE SEAL PLATE

(71) Applicant: Hamilton Sundstrand Corporation, Windsor Locks, CT (US)

(72) Inventors: Craig M. Beers, Wethersfield, CT (US); Eric Chrabascz, Longmeadow, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 152 days.

(21) Appl. No.: 14/731,523

(22) Filed: Jun. 5, 2015

(65) Prior Publication Data
US 2016/0356167 A1    Dec. 8, 2016

(51) Int. Cl.
| | |
|---|---|
| *F01D 25/24* | (2006.01) |
| *F01D 11/02* | (2006.01) |
| *B64D 13/08* | (2006.01) |
| *B64D 13/06* | (2006.01) |

(52) U.S. Cl.
CPC ............ *F01D 11/02* (2013.01); *B64D 13/08* (2013.01); *F01D 25/243* (2013.01); *B64D 2013/0648* (2013.01); *F05D 2220/40* (2013.01)

(58) Field of Classification Search
None
See application file for complete search history.

(56) References Cited

U.S. PATENT DOCUMENTS

| | | | |
|---|---|---|---|
| 6,682,077 B1 * | 1/2004 | Letourneau | F01D 1/36 277/409 |
| 7,402,020 B2 | 7/2008 | Beers et al. | |
| 8,347,647 B2 | 1/2013 | McAuliffe et al. | |
| 8,418,495 B2 | 4/2013 | Merritt et al. | |
| 8,475,114 B2 | 7/2013 | Rosen et al. | |
| 8,821,113 B2 | 9/2014 | Richardson et al. | |
| 8,864,456 B2 | 10/2014 | Beers et al. | |
| 2009/0160135 A1 * | 6/2009 | Turini | F01D 11/02 277/418 |
| 2012/0193875 A1 * | 8/2012 | Deo | F01D 11/003 277/412 |
| 2013/0071239 A1 * | 3/2013 | Beers | F01D 5/141 415/208.1 |
| 2014/0186161 A1 * | 7/2014 | Colson | F04D 17/122 415/170.1 |
| 2014/0300058 A1 * | 10/2014 | Brunet | F01D 11/02 277/351 |
| 2015/0098805 A1 * | 4/2015 | Beers | B64D 13/00 415/170.1 |
| 2015/0098814 A1 | 4/2015 | Colson et al. | |

* cited by examiner

*Primary Examiner* — Dwayne J White
*Assistant Examiner* — Theodore Ribadeneyra
(74) *Attorney, Agent, or Firm* — Cantor Colburn LLP

(57) ABSTRACT

A turbine seal plate includes an inner rim with a labyrinth seal land that defines a central bore having a labyrinth seal diameter. The turbine seal plate also includes a housing coupling ring arranged radially outward of the inner rim. A housing pilot extends axially from the housing coupling ring and substantially parallel to the labyrinth seal land with respect to a radially inner portion of the housing pilot. The housing pilot has a housing pilot thickness, and a ratio of the housing pilot thickness to the labyrinth seal diameter is between 0.08 and 0.14. A frusto-conical body extends between the radially inner portion of the housing pilot and the inner rim of the turbine seal plate.

11 Claims, 4 Drawing Sheets

AIR CYCLE MACHINE TURBINE SEAL PLATE

BACKGROUND

The present disclosure generally relates to aircraft environmental control systems and, more particularly, to a turbine seal plate of an air cycle machine utilized as part of an aircraft environmental control system.

Conventional aircraft environmental control systems (ECS) incorporate an air cycle machine (ACM), also referred to as an air cycle cooling machine, for cooling and dehumidifying air supplied to an aircraft cabin. ACMs commonly include at least one turbine and a compressor spaced axially at intervals on a common shaft. The turbine(s) and compressor are supported for rotation about the axis of the shaft by one or more bearing assemblies.

On aircraft powered by turbine engines, the air to be conditioned in the air cycle machine is typically compressed air bled from one or more compressor stages of a turbine engine. In conventional systems, this bleed air is passed through the air cycle machine compressor, where it is further compressed, then passed through a condensing heat exchanger to cool the compressed air. The heat exchanger sufficiently condenses moisture thereby dehumidifying the air. The dehumidified compressed air is then expanded in one of the turbines to extract energy from the compressed air so as to drive the shaft and also to cool the expanded turbine exhaust air as it is supplied to the cabin as conditioned cooling air.

ACM components are typically sized to minimize leakage of pressurized airflow. In some instances, pressure differentials within the ACM can distort or deflect ACM components, which can result in excess rubbing of ACM components and reduced efficiency. Increasing clearances between ACM components can result in excess leakage and reduced thermodynamic performance.

BRIEF DESCRIPTION

According to one embodiment, a turbine seal plate includes an inner rim with a labyrinth seal land that defines a central bore having a labyrinth seal diameter. The turbine seal plate also includes a housing coupling ring arranged radially outward of the inner rim. A housing pilot extends axially from the housing coupling ring and substantially parallel to the labyrinth seal land with respect to a radially inner portion of the housing pilot. The housing pilot has a housing pilot thickness, and a ratio of the housing pilot thickness to the labyrinth seal diameter is between 0.08 and 0.14. A frusto-conical body extends between the radially inner portion of the housing pilot and the inner rim of the turbine seal plate.

According to another embodiment, an air cycle machine assembly is provided. The air cycle machine assembly includes a shaft, a turbine housing, a compressor housing, and a turbine seal plate. The turbine seal plate includes an inner rim with a labyrinth seal land that defines a central bore having a labyrinth seal diameter. The shaft forms a labyrinth seal with respect to the labyrinth seal land. The turbine seal plate also includes a housing coupling ring arranged radially outward of the inner rim, where the housing coupling ring is coupled to the turbine housing and the compressor housing. The turbine seal plate further includes a housing pilot that contacts the turbine housing and the compressor housing. The housing pilot extends axially from the housing coupling ring and substantially parallel to the labyrinth seal land with respect to a radially inner portion of the housing pilot. The housing pilot has a housing pilot thickness, and a ratio of the housing pilot thickness to the labyrinth seal diameter is between 0.08 and 0.14. A frusto-conical body of the turbine seal plate extends between the radially inner portion of the housing pilot and the inner rim.

A method of installing a turbine seal plate in an air cycle machine includes aligning a housing coupling ring of a turbine seal plate with a turbine housing and a compressor housing. A housing pilot of the turbine seal plate is placed in contact with the turbine housing and the compressor housing. The housing pilot extends axially from the housing coupling ring and substantially parallel to a labyrinth seal land with respect to a radially inner portion of the housing pilot. The turbine housing and the compressor housing are coupled to the turbine seal plate through the housing coupling ring. A shaft is arranged within an inner rim of the turbine seal plate to form a labyrinth seal with respect to the labyrinth seal land. The inner rim includes the labyrinth seal land that defines a central bore having a labyrinth seal diameter. A frusto-conical body extends between the radially inner portion of the housing pilot and the inner rim, and a ratio of a housing pilot thickness to the labyrinth seal diameter is between 0.08 and 0.14.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
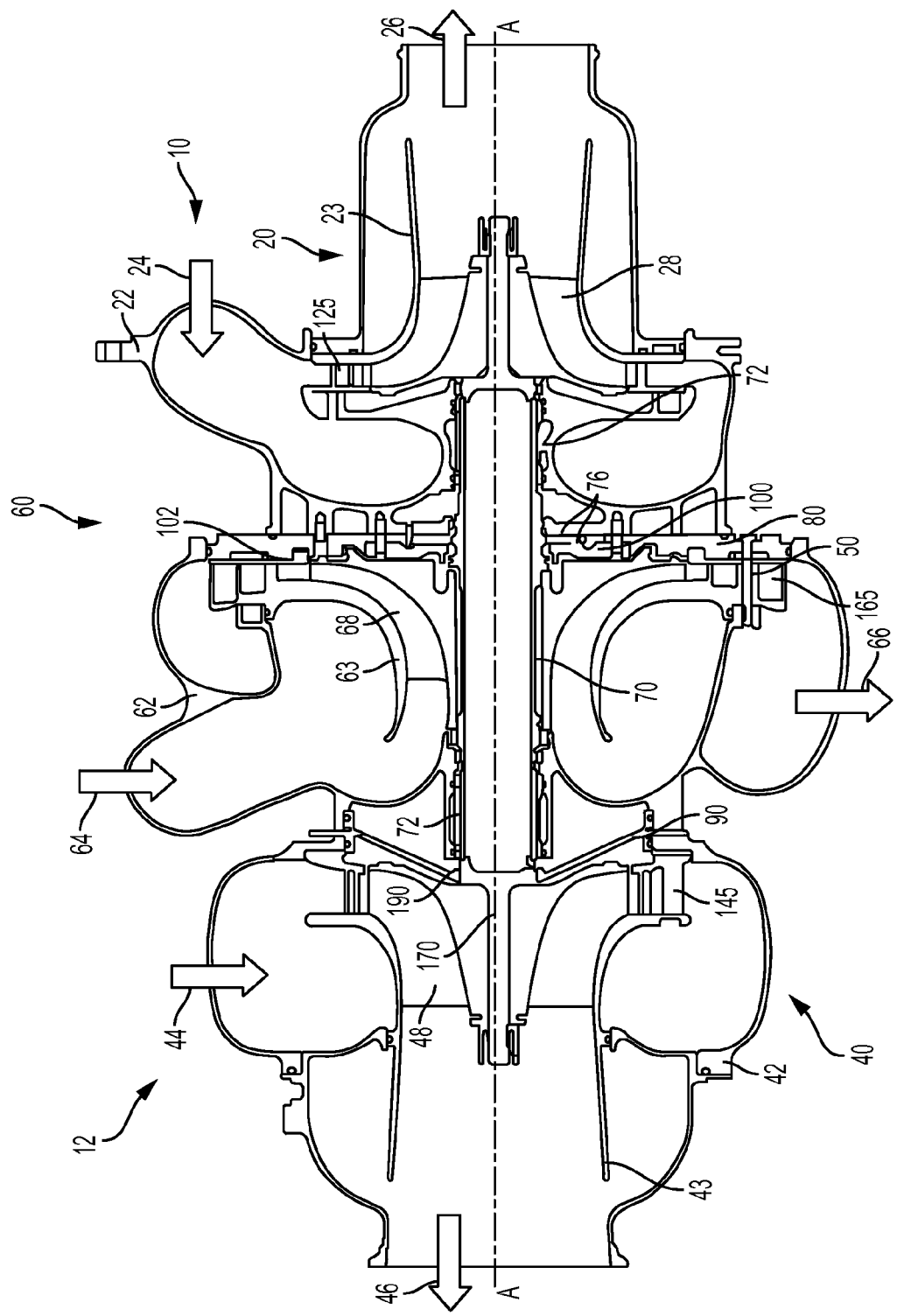
FIG. 1 is a cross-section of an air cycle machine (ACM) according to an embodiment.

Referring now to FIG. 1, an air cycle machine (ACM) 10 includes a first turbine 20, a second turbine 40, and a compressor 60. The ACM 10 includes a housing assembly 12 manufactured from multiple housing portions to provide a desired clearance for the compressor 60 and the turbines 20, 40. The ACM housing assembly 12 includes a first turbine housing 22, a compressor housing 62, and a second turbine housing 42. The ACM housing assembly 12 also includes first and second turbine shrouds 23 and 43, and a compressor shroud 63. The first turbine housing 22 and the second turbine housing 42 are connected to the centrally located compressor housing 62.

The first turbine 20 has an inlet 24, a nozzle 125, and an outlet 26. The second turbine 40 has an inlet 44, a nozzle 145, and an outlet 46. The compressor 60 also includes an inlet 64, a diffuser 165, and an outlet 66. The compressor 60 is driven by the first and second turbines 20 and 40. The first turbine 20 includes a first turbine rotor 28, the second turbine 40 includes a second turbine rotor 48, and the compressor 60 includes a compressor rotor 68. The first and second turbine rotors 28, 48 and the compressor rotor 68 are coupled to a shaft 70 for rotation about an axis A. In one embodiment, the shaft 70 is hollow and is supported within the ACM housing assembly 12 by bearings 72, such as hydrodynamic journal bearings, for example. The shaft 70 may include a plurality of apertures (not shown) such that a cooling flow enters into the shaft 70 to cool the bearings 72. Thrust bearings 76 are coupled to the shaft 70 to support axial loads in the ACM 10.

A first seal plate 80 separates air flow between the first turbine 20 and the compressor 60. A second seal plate 90 separates air flow between the compressor 60 and the second turbine 40. The first seal plate 80 is coupled to the first turbine housing 22 and the compressor housing 62. The second seal plate 90 is coupled to the second turbine housing 42 and the compressor housing 62. The first seal plate 80 is also coupled to a thrust plate 100 to constrain axial movement of the thrust bearings 76. A backing plate 102 may be installed between the diffuser 165 of the compressor 60 and the first seal plate 80. A plurality of fasteners 50, such as bolts, may be used to secure the seal plates 80 and 90. The illustrated ACM 10 is an example and other configurations known to a person skilled in the art are within the scope of this disclosure. A combination of two or more components of the ACM 10 is referred to generally as an ACM assembly.

Figure 2:
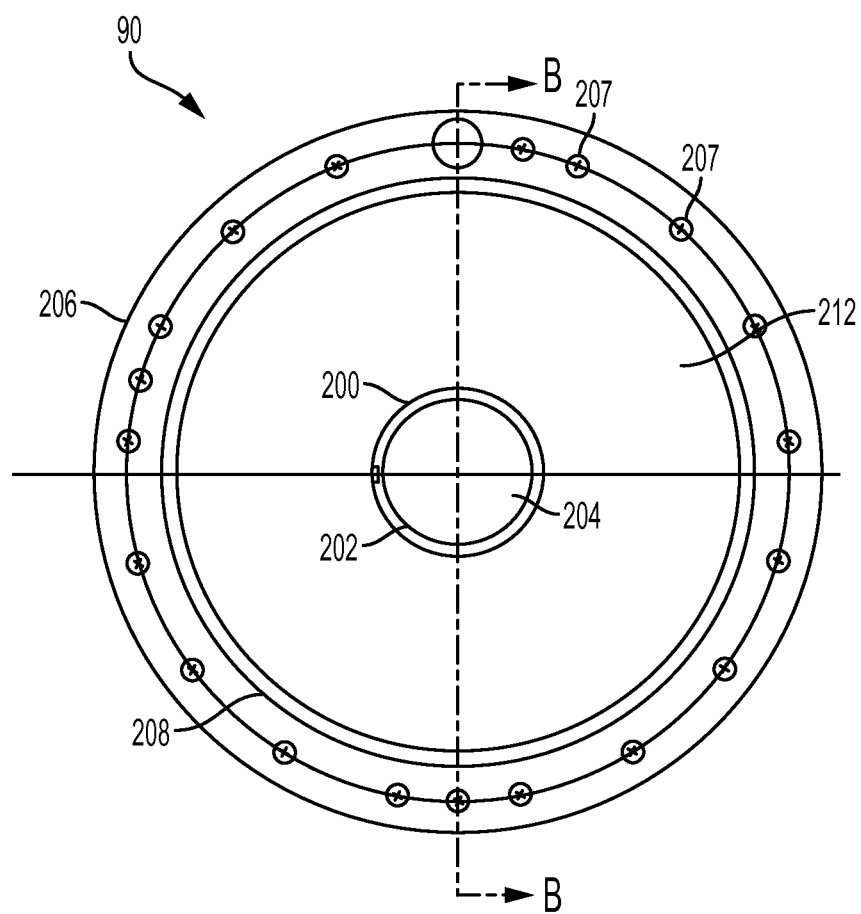
FIG. 2 is a view of a turbine seal plate of the ACM of FIG. 1 according to an embodiment.
Figure 3:
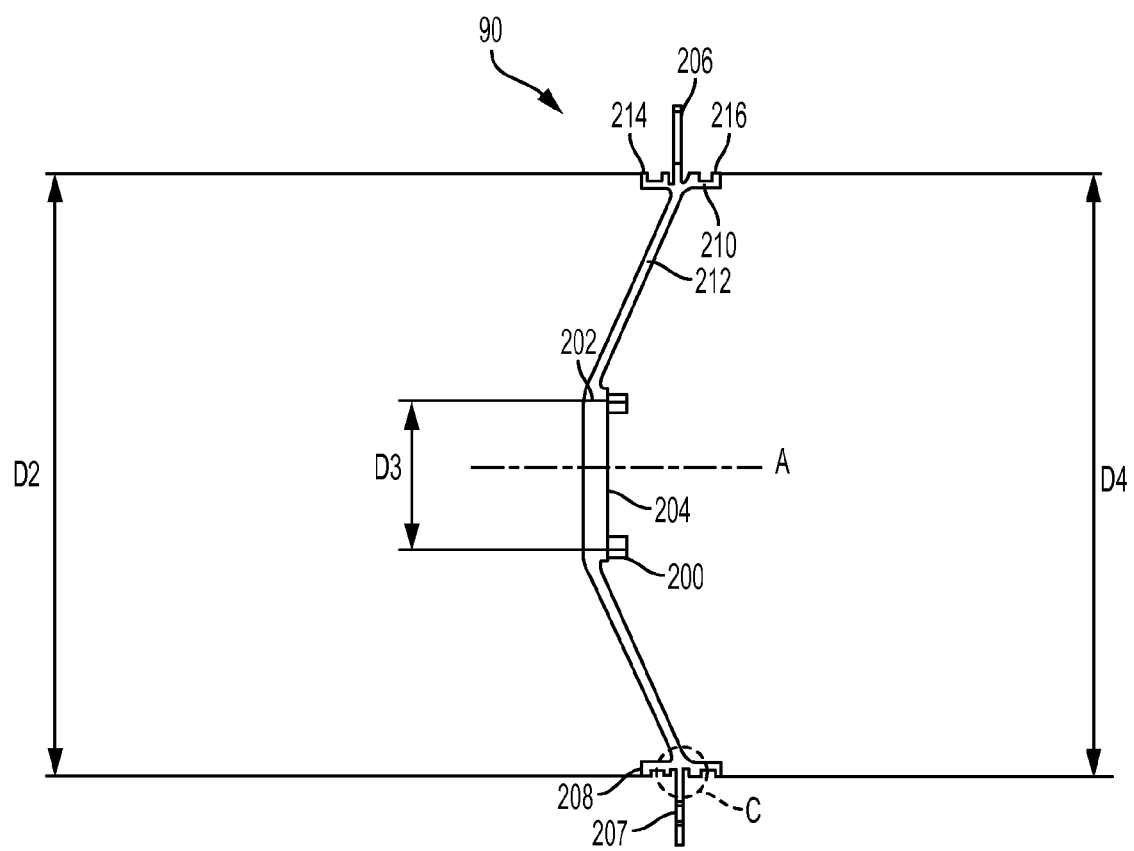
FIG. 3 is a cross-section of the turbine seal plate of the ACM of FIG. 1 according to an embodiment.
Figure 4:
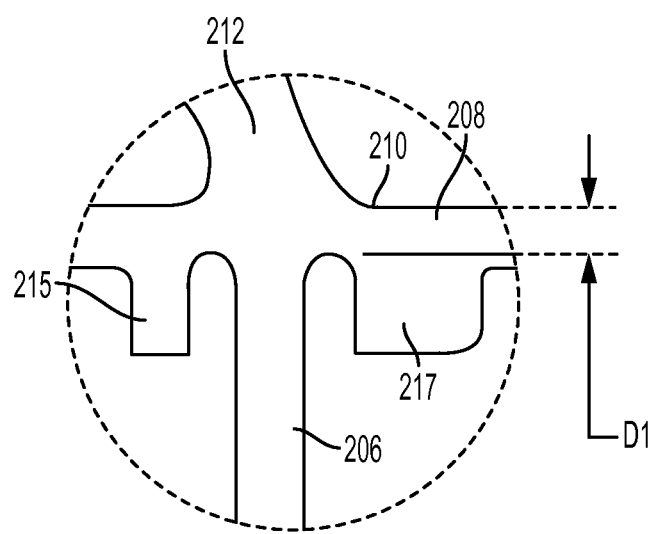
FIG. 4 is a detailed view of an area of the turbine seal plate of the ACM of FIG. 1 according to an embodiment.

The second seal plate 90 in the example of FIG. 1 is also referred to as turbine seal plate 90, as further described herein. An end portion 170 of shaft 70 interfaces with the turbine seal plate 90 to form a labyrinth seal 190 with respect to a labyrinth seal land 202 of the turbine seal plate 90, as best seen in FIGS. 2 and 3. FIG. 2 is a view of the turbine seal plate 90 of the ACM 10 of FIG. 1 according to an embodiment. FIG. 3 is a cross-section of the turbine seal plate 90 taken along line B-B of FIG. 2. FIG. 4 is a detailed view of an area C of the turbine seal plate 90 as seen in FIG. 3.

In reference to FIGS. 1-4, the turbine seal plate 90 includes an inner rim 200 with the labyrinth seal land 202 that defines a central bore 204 having a labyrinth seal diameter D3 of about 1.9685 inches (5.0 cm). The turbine seal plate 90 also includes a housing coupling ring 206 arranged radially outward of the inner rim 200. The housing coupling ring 206 includes a plurality of apertures 207 through which fasteners 50 of FIG. 1, such as bolts, can be secured. The housing coupling ring 206 is coupled to the turbine housing 42 and the compressor housing 62. A housing pilot 208 extends axially from the housing coupling ring 206 and substantially parallel to the labyrinth seal land 202 with respect to a radially inner portion 210 of the housing pilot 208. The housing pilot 208 has a housing pilot thickness D1 of about 0.105 inches (0.2667 cm). A frusto-conical body 212 extends between the radially inner portion 210 of the housing pilot 208 and the inner rim 200 of the turbine seal plate 90. In one embodiment, the frusto-conical body 212 has the shape of a cone with the narrow end, or tip, removed and has a conical angle of about 66 degrees.

The housing pilot 208 has a turbine housing pilot 214 defined by a first radially outer portion 215 of the housing pilot 208 having a turbine housing pilot diameter D2 of about 7.8935 inches (20.05 cm). The turbine housing pilot 214 of the housing pilot 208 contacts the turbine housing 42. The housing pilot 208 also includes a compressor housing pilot 216 defined by a second radially outer portion 217 of the housing pilot 208 having a compressor housing pilot diameter D4 of about 7.876 inches (20.005 cm). The compressor housing pilot 216 of the housing pilot 208 contacts the compressor housing 62. In an embodiment, a ratio of the housing pilot thickness D1 to the labyrinth seal diameter D3 is between 0.08 and 0.14. A ratio of the housing pilot thickness D1 to the turbine housing pilot diameter D2 is between 0.0101 and 0.0177. A ratio of the turbine housing pilot diameter D2 to the labyrinth seal diameter D3 is between 4.006 and 4.014. A ratio of the housing pilot thickness D1 to the compressor housing pilot diameter D4 is between 0.0102 and 0.0178. A ratio of the turbine housing pilot diameter D2 to the compressor housing pilot diameter D4 is between 1.001 and 1.003. A ratio of the labyrinth seal diameter D3 to the compressor housing pilot diameter D4 is between 0.249 and 0.251.

A process for installing the turbine seal plate 90 in the ACM 10 of FIG. 1 is described in reference to FIGS. 1-4. The sequence of assembly during installation of the turbine seal plate 90 in the ACM 10 can vary in embodiments. The process includes aligning a housing coupling ring 206 of the turbine seal plate 90 with a turbine housing 42 and a compressor housing 62. A housing pilot 208 of the turbine seal plate 90 is placed in contact with the turbine housing 42 and the compressor housing 62. The housing pilot 208 extends axially from the housing coupling ring 206 and substantially parallel to a labyrinth seal land 202 with respect to a radially inner portion 210 of the housing pilot 208. The turbine housing 42 and the compressor housing 62 are coupled to the turbine seal plate 90 through the apertures 207 of the housing coupling ring 206, e.g., using fasteners 50, such as bolts. A shaft 70 (with end portion 170) is arranged within an inner rim 200 of the turbine seal plate 90 to form a labyrinth seal 190 with respect to the labyrinth seal land 202. Additional elements described with respect to FIG. 1 can also be installed in the ACM 10 before or after installation of the turbine seal plate 90.

The terminology used herein is for the purpose of describing particular embodiments only and is not intended to be limiting. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A turbine seal plate for an air cycle machine, the turbine seal plate comprising:
an inner rim comprising a labyrinth seal land that defines a central bore having a labyrinth seal diameter;
a housing coupling ring arranged radially outward of the inner rim;
a housing pilot extending axially from the housing coupling ring and substantially parallel to the labyrinth seal land with respect to a radially inner portion of the housing pilot, wherein the housing pilot comprises a turbine housing pilot defined by a first radially outer portion of the housing pilot having a turbine housing pilot diameter, and the housing pilot further comprises a compressor housing pilot defined by a second radially outer portion of the housing pilot having a compressor housing pilot diameter, wherein the housing pilot has a housing pilot thickness, a ratio of the housing pilot thickness to the labyrinth seal diameter is between 0.08 and 0.14, a ratio of the housing pilot thickness to the turbine housing pilot diameter is between 0.0101 and 0.0177, and a ratio of the housing pilot thickness to the compressor housing pilot diameter is between 0.0102 and 0.0178; and a frusto-conical body extending between the radially inner portion of the housing pilot and the inner rim.

2. The turbine seal plate according to claim 1, wherein a ratio of the turbine housing pilot diameter to the labyrinth seal diameter is between 4.006 and 4.014.

3. The turbine seal plate according to claim 1, wherein a ratio of the turbine housing pilot diameter to the compressor housing pilot diameter is between 1.001 and 1.003.

4. The turbine seal plate according to claim 1, wherein a ratio of the labyrinth seal diameter to the compressor housing pilot diameter is between 0.249 and 0.251.

5. An air cycle machine assembly comprising:
a shaft;
a turbine housing;
a compressor housing; and
a turbine seal plate comprising:
an inner rim comprising a labyrinth seal land that defines a central bore having a labyrinth seal diameter, wherein the shaft forms a labyrinth seal with respect to the labyrinth seal land;
a housing coupling ring arranged radially outward of the inner rim, the housing coupling ring coupled to the turbine housing and the compressor housing;
a housing pilot that contacts the turbine housing and the compressor housing and extends axially from the housing coupling ring and substantially parallel to the labyrinth seal land with respect to a radially inner portion of the housing pilot, wherein the housing pilot comprises a turbine housing pilot defined by a first radially outer portion of the housing pilot having a turbine housing pilot diameter, and the housing pilot further comprises a compressor housing pilot defined by a second radially outer portion of the housing pilot having a compressor housing pilot diameter, wherein the housing pilot has a housing pilot thickness, a ratio of the housing pilot thickness to the labyrinth seal diameter is between 0.08 and 0.14, a ratio of the housing pilot thickness to the turbine housing pilot diameter is between 0.0101 and 0.0177, and a ratio of the housing pilot thickness to the compressor housing pilot diameter is between 0.0102 and 0.0178; and
a frusto-conical body extending between the radially inner portion of the housing pilot and the inner rim.

6. The air cycle machine assembly according to claim 5, wherein a ratio of the turbine housing pilot diameter to the labyrinth seal diameter is between 4.006 and 4.014.

7. The air cycle machine assembly according to claim 5, wherein a ratio of the turbine housing pilot diameter to the compressor housing pilot diameter is between 1.001 and 1.003.

8. The air cycle machine assembly according to claim 5, wherein a ratio of the labyrinth seal diameter to the compressor housing pilot diameter is between 0.249 and 0.251.

9. A method of installing a turbine seal plate in an air cycle machine, comprising:
aligning a housing coupling ring of a turbine seal plate with a turbine housing and a compressor housing;
placing a turbine housing pilot of a housing pilot of the turbine seal plate in contact with the turbine housing and a compressor housing pilot of the housing pilot of the turbine seal plate in contact with the compressor housing, the housing pilot extending axially from the housing coupling ring and substantially parallel to a labyrinth seal land with respect to a radially inner portion of the housing pilot, wherein the turbine housing pilot is defined by a first radially outer portion of the housing pilot having a turbine housing pilot diameter and the compressor housing pilot is defined by a second radially outer portion of the housing pilot having a compressor housing pilot diameter;
coupling the turbine housing and the compressor housing to the turbine seal plate through the housing coupling ring; and
arranging a shaft within an inner rim of the turbine seal plate to form a labyrinth seal with respect to the labyrinth seal land, wherein the inner rim comprises the labyrinth seal land that defines a central bore having a labyrinth seal diameter, a frusto-conical body extends between the radially inner portion of the housing pilot and the inner rim, and a ratio of a housing pilot thickness to the labyrinth seal diameter is between 0.08 and 0.14, a ratio of the housing pilot thickness to the turbine housing pilot diameter is between 0.0101 and 0.0177, and a ratio of the housing pilot thickness to the compressor housing pilot diameter is between 0.0102 and 0.0178.

10. The method according to claim 9, wherein a ratio of the turbine housing pilot diameter to the labyrinth seal diameter is between 4.006 and 4.014.

11. The method according to claim 9, wherein a ratio of the turbine housing pilot diameter to the compressor housing pilot diameter is between 1.001 and 1.003, and a ratio of the labyrinth seal diameter to the compressor housing pilot diameter is between 0.249 and 0.251.

* * * * *